(12) United States Patent
Tan et al.

(10) Patent No.: US 10,200,884 B2
(45) Date of Patent: Feb. 5, 2019

(54) ANALYTICS-ASSISTED, MULTI-AGENTS, SELF-LEARNING, SELF-MANAGING, FLEXIBLE AND ADAPTIVE FRAMEWORK FOR INTELLIGENT SON

(71) Applicant: Futurewei Technologies, Inc., Plano, TX (US)

(72) Inventors: Yongxi Tan, Hillsborough, NJ (US); Jin Yang, Bridgewater, NJ (US)

(73) Assignee: Futurewei Technologies, Inc., Plano, TX (US)

(*) Notice: Subject to any disclaimer, the term of this patent is extended or adjusted under 35 U.S.C. 154(b) by 212 days.

(21) Appl. No.: 14/994,942

(22) Filed: Jan. 13, 2016

(65) Prior Publication Data

US 2016/0205697 A1    Jul. 14, 2016

Related U.S. Application Data

(60) Provisional application No. 62/103,452, filed on Jan. 14, 2015.

(51) Int. Cl.
*H04W 4/00* (2018.01)
*H04W 24/02* (2009.01)

(52) U.S. Cl.
CPC .................. *H04W 24/02* (2013.01)

(58) Field of Classification Search
CPC ....................................................... H04W 4/00
(Continued)

(56) References Cited

U.S. PATENT DOCUMENTS

2013/0122885 A1    5/2013    Kojima
2013/0315077 A1    11/2013    Toshiaki et al.
(Continued)

FOREIGN PATENT DOCUMENTS

CN    101964985 A    2/2011
CN    103220699 A    7/2013
(Continued)

OTHER PUBLICATIONS

Cinar, A., et al., "Monitoring, Analysis and Diagnosis of Distributed Processes with Agent-Based Systems," In Proceedings of the International IFAC Symposium on Advanced Control of Chemical Processes (ADCHEM), Jul. 2009, 6 pages.
(Continued)

*Primary Examiner* — Dang T Ton
(74) *Attorney, Agent, or Firm* — Slater Matsil, LLP

(57) ABSTRACT

The strengths of alternative self-organizing-network (SON) techniques can be leveraged by deriving a compromise result from alternative results generated by the respective SON techniques. In particular, the compromise result may be derived from the alternative results based on reputations assigned to alternative SON techniques used to generate the respective results. The compromise result may be calculated based on weighted averages of the alternative results (e.g., solutions, diagnoses, predicted values, etc.), or on weighted averages of parameters specified by the alternative results (e.g., parameter adjustments, underlying causes, KPI values, etc.). In such an embodiment, the weights applied to the alternative results may be based on the reputations of the corresponding SON techniques used to generate the respective alternative results.

20 Claims, 9 Drawing Sheets

(58) Field of Classification Search
USPC .......................................................... 370/329
See application file for complete search history.

(56) References Cited

U.S. PATENT DOCUMENTS

2014/0000440 A1* 1/2014 Georges .................. G10H 7/00
84/609
2014/0120921 A1   5/2014 Keskitalo et al.
2014/0329528 A1* 11/2014 Zhao ..................... H04W 36/30
455/436

FOREIGN PATENT DOCUMENTS

| CN | 103718604 A | 4/2014 |
| CN | 103999501 A | 8/2014 |

OTHER PUBLICATIONS

MacGregor, J., et al., "Monitoring, Fault Diagnosis, Fault-Tolerant Control and Optimization: Data driven methods," Computers & Chemical Engineering, vol. 47, Dec. 20, 2012, pp. 111-120.
Iacoboaiea, O. et al., "SON Coordination for parameter conflict resolution: A reinforcement learning framework", IEEE WCNC 2014—Workshop on Self-Organizing Networks, Apr. 2014, 6 pages.

* cited by examiner

ANALYTICS-ASSISTED, MULTI-AGENTS, SELF-LEARNING, SELF-MANAGING, FLEXIBLE AND ADAPTIVE FRAMEWORK FOR INTELLIGENT SON

This patent application claims priority to U.S. Provisional Application No. 62/103,452, filed on Jan. 14, 2015 and entitled "An Analytics-Assisted, Multi-agents, Self-Learning, Self-managing, Flexible and Adaptive Framework for Intelligent SON," which is hereby incorporated by reference herein as if reproduced in its entirety.

TECHNICAL FIELD

The present invention relates to telecommunications, and, in particular embodiments, to an analytics-assisted, multi-agents, self-learning, self-managing, flexible and adaptive framework for intelligent self-organizing-network (SON).

BACKGROUND

Modern mobile telecommunication networks are becoming larger and more complex, as the industry migrates towards densely-deployed networks that include large numbers of highly concentrated cells capable of providing near-ubiquitous coverage, as well as heterogeneous networks (Het-Nets) capable of supporting different air-interface technologies. As mobile networks grow larger and more complex, they become increasingly difficult to manage and operate, as control decisions are oftentimes made based on incomplete, stale, and, in some cases, inaccurate information. Due to their increased scale and complexity, it is also more challenging to identify, diagnose, and troubleshoot quality and performance related issues, such as those related to coverage and capacity, interference, and mobility. To make these challenges more manageable, Self-Organizing-Network (SON) automation technology is being developed.

SUMMARY OF THE INVENTION

Technical advantages are generally achieved, by embodiments of this disclosure which describe an analytics-assisted, multi-agents, self-learning, self-managing, flexible and adaptive framework for intelligent self-organizing-network (SON).

In accordance with an embodiment, a method for self-optimization is provided. In this example, the method includes receiving information from devices in a wireless network during a first period, and generating alternative optimization solutions for the wireless network using alternative self-optimization techniques based on the information received during the first period. At least some of the alternative optimization solutions specify different values for adjusting one or more wireless configuration parameters of the wireless network. The method further includes calculating a compromise solution between the alternative optimization solutions based on reputations of the alternative self-optimization techniques used to generate the respective alternative optimization solutions, and sending the compromise solution to one or more access points in the wireless network, the compromise solution being used in the wireless network during a second period.

The method may further include assigning reputations to the alternative self-optimization techniques based on the efficacy of previous optimization solutions generated by the alternative self-optimization techniques. In an embodiment, assigning reputations to the alternative self-optimization techniques based on the efficacy of the previous optimization solutions includes incrementing a reputation of a given self-optimization technique when a previous optimization solution generated by the given self-optimization technique, or a parameter adjustment specified by the previous optimization solution, improves a corresponding quality or performance metric when implemented in the wireless network, and decrementing the reputation of the given self-optimization technique when the previous optimization solution, or a parameter adjustment specified by the previous optimization solution, negatively impacts the corresponding quality or performance metric when implemented in the wireless network.

In an embodiment, calculating the compromise solution comprises calculating a weighted average of values for a wireless configuration parameter specified by the alternative optimization solutions based on reputations of the corresponding alternative self-optimization techniques, and setting the compromise solution to adjust the wireless configuration parameter based on the weighted average of the values specified by the alternative optimization solutions. In such an embodiment, values of alternative optimization solutions are assigned heavier weights when the alternative optimization solutions are generated by alternative self-optimization techniques having higher reputations than when the alternative optimization solutions are generated by alternative self-optimization techniques having lower reputations.

In another embodiment, calculating the compromise solution comprises determining whether a majority, or a super minority, of the alternative optimization solutions increase, decrease, or maintain a value of a wireless configuration parameter, and setting the compromise solution based on that determination. In particular, the compromise solution may be set to increase the wireless configuration parameter when a majority, or a super minority, of the alternative optimization solutions increase the wireless configuration parameter, set to decrease the wireless configuration parameter when a majority, or a super minority, of the alternative optimization solutions decrease the wireless configuration parameter, and set to maintain the value of the wireless configuration parameter when a majority, or a super minority, of the alternative optimization solutions maintain the value of the wireless configuration parameter.

In yet another embodiment, calculating the compromise solution comprises assigning weighted votes to the alternative optimization solutions based on the reputations of the corresponding alternative self-optimization techniques used to generate the respective alternative optimization solutions, determining whether a weighted majority, or a weighted super minority, of the alternative optimization solutions increase, decrease, or maintain a value of a given wireless configuration parameter, and setting the compromise solution based on the determination. Alternative optimization solutions generated by alternative self-optimization techniques that have higher reputations are assigned more heavily weighted votes than alternative optimization solutions generated by alternative self-optimization techniques that have a lower reputations. Setting the compromise solution based on the determination may include setting the compromise solution to increase the given wireless configuration parameter when a weighted majority, or a weighted super minority, of the alternative optimization solutions increase the given wireless configuration parameter, setting the compromise solution to decrease the given wireless configuration parameter when a weighted majority, or a weighted super minority, of the alternative optimization solutions decrease the given wireless configuration parameter, and setting the compromise solution to maintain the value of the given wireless configuration parameter when a weighted majority, or a weighted super minority, of the alternative optimization solutions maintain the value of the given wireless configuration parameter.

In accordance with another embodiment, a method for self-diagnosis is provided. In this example, the method includes receiving information from devices in a wireless network during a first period, generating alternative diagnoses using alternative diagnostic techniques based on the information received from the devices, and calculating a compromise diagnosis between the alternative diagnostic techniques based on reputations assigned to the alternative self-diagnostic techniques. At least some of the alternative diagnoses specify different underlying causes for a quality or performance problem. The compromise diagnosis may be used to reconfigure one or more access points in the wireless network during a second period in order to at least partially alleviate the quality or performance problem.

In an embodiment, at least some of the alternative diagnoses are generated based on different types of information generated during the first period.

The method may further include assigning reputations to the alternative self-diagnostic techniques based on the efficacy of previous diagnoses generated by the alternative self-diagnostic techniques. In an embodiment, assigning the reputations includes incrementing a reputation of a given alternative diagnostic technique when a previous diagnoses generated by the given alternative diagnostic technique is deemed to have correctly identified an underlying cause of the quality or performance problem, and decrementing the reputation of the given alternative diagnostic technique when a previous diagnoses generated by the given alternative diagnostic technique is deemed to have failed to identify an underlying cause of the quality or performance problem.

In an embodiment, calculating the compromise diagnosis includes setting the compromise diagnosis to identify a cause of the quality or performance problem that is specified by a majority, or a super minority, of the alternative diagnoses.

In another embodiment, calculating the compromise diagnosis includes assigning a weighted vote to each of the alternative diagnoses based on the reputations of the corresponding alternative self-diagnostic techniques, and setting the compromise diagnosis to identify an underlying cause of the quality or performance problem that is specified by a weighted majority, or a weighted super minority, of the alternative diagnoses. Alternative diagnoses generated by alternative self-diagnostic techniques having higher reputations are assigned more heavily weighted votes than alternative diagnoses generated by alternative self-diagnostic techniques having lower reputations.

In accordance with another embodiment, a method for predicting future key values is provided. In this example, the method further includes receiving information from devices in a wireless network during a first period, predicting alternative values for a future period in a wireless network using alternative prediction techniques, wherein at least some of the alternative values are different than one another, and calculating a compromise value between the alternative values based on reputations of the alternative prediction techniques. The compromise is used to adapt a wireless configuration parameter of one or more access points in the wireless network during the future period.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
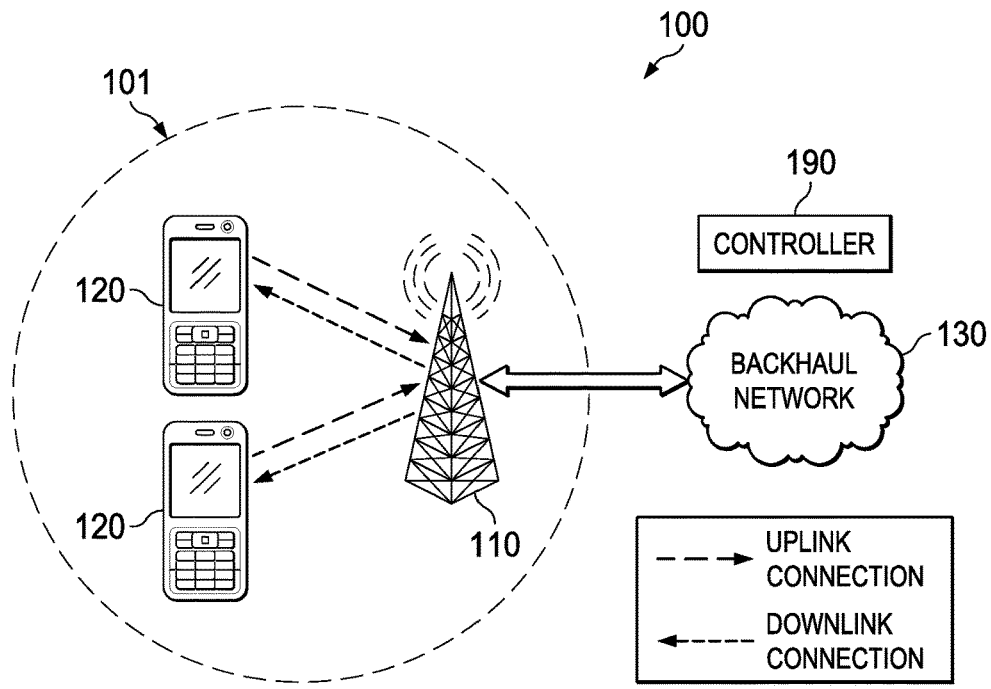
FIG. 1 illustrates a diagram of an embodiment wireless communications network.

The making and using of embodiments of this disclosure are discussed in detail below. It should be appreciated, however, that the present disclosure provides many applicable inventive concepts that can be embodied in a wide variety of specific contexts. The specific embodiments discussed are merely illustrative of specific ways to make and use the various embodiments disclosed herein, and do not limit the scope of the disclosure.

Controllers may use SON techniques to perform various SON-related tasks in a mobile radio access network, such as a self-planning task, self-management task, self-optimization task, or self-diagnostic task. As used herein, the term "SON technique" generally refers to any autonomous technique that is used to perform a SON-related task in a mobile radio access network, and the term "result" generally refers to an output of a SON technique. In one example, a SON technique is a self-optimization technique, and a result is an optimization solution generated by the self-optimization technique. In another example, a SON technique is a self-diagnostic technique, and a result is a diagnosis generated by the self-diagnostic technique. As yet another example, a SON technique is a prediction technique used when performing a SON-related task (e.g., self-planning, etc.), and a result is a prediction generated by the prediction technique. Other examples are also possible.

Alternative SON techniques may use strategies to solve the same SON-related problem. For example, one coverage capacity optimization (CCO) algorithm may use load-balancing strategies in an attempt to achieve a desired level of coverage/throughput performance, while another CCO algorithm may rely heavily on interference reduction to attempt to achieve a similar level of performance by managing/reducing inter-cell interference. In such an example, the former CCO algorithm may seek to improve coverage/throughput by adjusting antenna tilts and/or transmit power levels in a manner that distributes traffic across multiple coverage areas, while the latter CCO algorithm may seek to improve coverage/throughput by adjusting antenna tilts and/or transmit power levels in a manner that reduces inter-cell interference. As another example, variety of self-healing techniques may be used for cell outage compensation (COC), for example, reinforcement learning based COC techniques, simulated annealing based techniques, and domain knowledge based COC techniques. As another example, variety of diagnosis techniques are available to identify the problematic cells (e.g., Kalman-filter based anomaly detection technique, principle component analysis based anomaly detection techniques, etc.) and pinpoint the root cause for the identified problem (e.g., decision-tree based classification techniques, expert system based root cause analysis techniques, random forest based classification techniques, etc.). Yet another example, variety prediction techniques are used to predict entities of interest, for example, KPIs (e.g., time-series based KPI prediction techniques, principle component regression based prediction techniques, partial least square based techniques), UE locations (e.g., fingerprint based UE localization techniques, Gaussian mixed model based techniques), etc.

By virtue of using different strategies, alternative SON techniques may yield varying degrees of effectiveness across different network environments. Referring to the example discussed above, the CCO algorithm that relies heavily on load balancing may provide better coverage and/or throughput performance in wireless networks experiencing volatile traffic distributions (e.g., an influx of new subscribers), while the CCO algorithm that relies heavily on interference reduction may provide better coverage and/or throughput performance in wireless networks experience high traffic volumes. As a result, network operators may achieve vastly different performance depending on which SON technique they elect to use.

Aspects of this disclosure leverage the strengths of alternative SON techniques by deriving a compromise result from the alternative results generated by the respective SON techniques. In particular, the compromise result may be derived from the alternative results based on reputations assigned to alternative SON techniques used to generate the respective results. The compromise result may be calculated/determined based on the aforementioned reputations in a variety of ways. In one embodiment, a compromise result is calculated based on weighted averages of the alternative results (e.g., solutions, diagnoses, predicted values, etc.), or on weighted averages of parameters specified by the alternative results (e.g., parameter adjustments, underlying causes, KPI values, etc.). In such an embodiment, the weights applied to the alternative results may be based on the reputations of the corresponding SON techniques used to generate the respective alternative results.

In another embodiment, a compromise result is determined using a "majority rules" approach such that the compromise result is set based on a majority, or a super minority, of the alternative results generated by the different SON techniques. In such an embodiment, the reputation assigned to each SON technique may be approximately equal such that each alternative result has the same influence on the compromise result. In yet another embodiment, a compromise result is determined using a "weighted consensus" approach such that the compromise result is set based on a weighted majority, or a weighted super minority, of the alternative results. In such an embodiment, the weighted majority/super-minority may be determined by assigning a weighted vote to each of the alternative results based on reputations assigned to the alternative SON techniques, with alternative results generated by SON techniques having higher reputations being allocated more heavily weighted votes than alternative results generated by alternative SON techniques having lower reputations.

Reputations may be assigned to alternative SON techniques based on the efficacy of previous results generated by the alternative SON techniques. By way of example, reputations may be assigned to alternative SON techniques based on how effective previous results generated by the alternative SON techniques were at improving, or maintaining, a quality/performance metric. The quality/performance metric may be a cost metric, or a utility metric, calculated based on an objective function. Objective functions are discussed in greater detail in U.S. patent application Ser. No. 14/988,512 entitled "Self-Learning, Adaptive Approach for Intelligent Analytics-Assisted Self-Organizing-Networks (SONs)," which is incorporated by reference herein as if reproduced in its entirety.

In one embodiment, the reputation of a given SON technique is incremented when a previous result, or a parameter specified by a previous result positively impacts of a corresponding quality/performance metric (e.g., reduces a cost metric, increases a utility metric, improves KPIs of interest, improves classification accuracy for diagnosis, improves prediction accuracy, etc.) Likewise, the reputation of the given SON technique may be decremented when the previous result, or a parameter specified by the previous result, negatively impacts a corresponding quality/performance metric (e.g., increases a cost metric, decreases a utility metric, etc.). The determination as to whether a quality/performance metric was positively or negatively impacted by previous results generated by a given SON technique may be made by tracking instances in which a parameter of the corresponding compromise result (e.g., the result derived in part from the previous result in question) is the same as, or substantially similar to, a parameter of the previous solution. In cases where it is, an online evaluation of the compromise result may be used to evaluate the efficacy of the previous result computed by the given SON technique. Alternatively, the determination as to whether the quality or performance metric was positively or negatively impacted by the previous solution may be made via offline simulation. In other embodiments, the reputation of a given SON technique is assigned based on probabilities (e.g., Bayesian probabilities) or confidence levels derived from past results. These and other aspects are discussed in greater detail below.

FIG. 1 is a diagram of a wireless network 100 for communicating data. The wireless network 100 includes an access point (AP) 110 having a wireless coverage area 101, a plurality of mobile devices 120, a backhaul network 130, and a controller 190. As shown, the AP 110 establishes uplink (dashed line) and/or downlink (dotted line) connections with the mobile devices 120, which serve to carry data from the mobile devices 120 to the AP 110 and vice-versa. Data carried over the uplink/downlink connections may include data communicated between the mobile devices 120, as well as data communicated to/from a remote-end (not shown) by way of the backhaul network 130. As used herein, the term "access point (AP)" refers to any component (or collection of components) configured to provide wireless access in a network, such as an evolved NodeB (eNB), a macro-cell, a femtocell, a Wi-Fi access point (AP), or other wirelessly enabled devices. The terms "access point (AP)" and "base station" are used interchangeably herein. Access points (APs) may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with an AP, such as a user equipment (UE), a mobile station (STA), relay, device engaging in machine type communications, or other wirelessly enabled devices. The controller 190 may be any component, or collection of components, adapted to perform network optimization for the wireless coverage area 101. The controller 190 may be co-located with the AP 110. Alternatively, the controller 190 may be separate and distinct from the AP 110, in which case the controller 190 may communicate with the AP over the backhaul network 130. In some embodiments, the network 100 may comprise various other wireless devices, such as low power nodes, etc.

Figure 2:
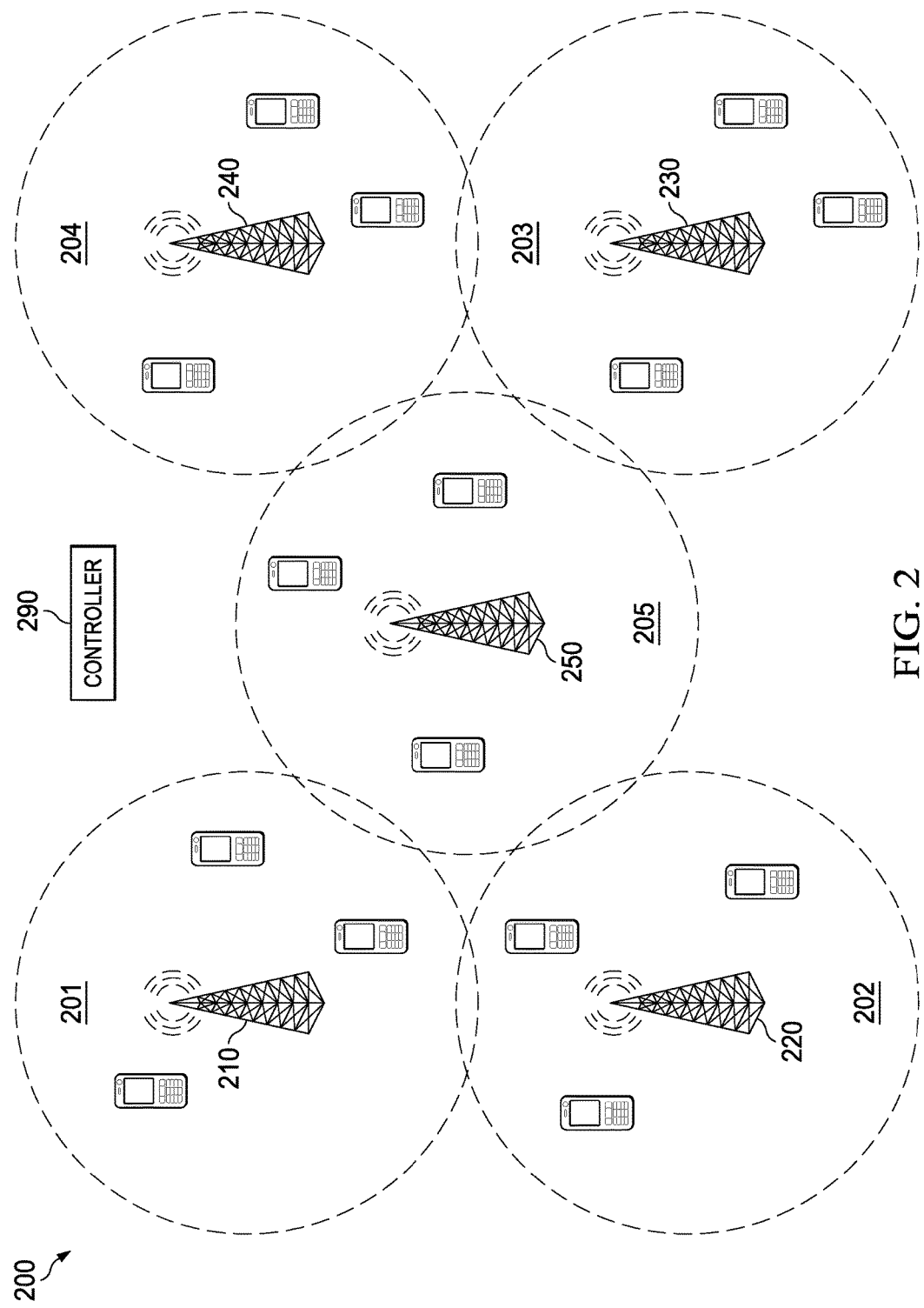
FIG. 2 illustrates a diagram of another embodiment wireless communications network comprising a cluster of cells.

FIG. 2 illustrates a wireless network 200 comprising local coverage areas 201, 202, 203, 204, 205 within which wireless access is provided to mobile devices by APs 210, 220, 230, 240, 250 (respectively). It should be appreciated that the wireless network 200 is shown as including five local coverage areas 201, 202, 203, 204, 205 for purposes of brevity and clarity, and that inventive aspects provided can be used in wireless networks having any number of local coverage areas. It should also be appreciated that, in some implementations, the wireless network 200 may be a heterogeneous network (Het-Net) in which at least some of the APs 210, 220, 230, 240, 250 communicate using different wireless access technologies.

Modifying wireless configuration parameters in one of the local coverage areas 201, 202, 203, 204, 205 may affect another performance in that local coverage area as well as the other local coverage areas. For example, increasing a transmit power level in the local coverage area 205 may improve coverage and capacity in the local coverage area 205, while also increasing inter-cell-interference in the local coverage areas 201, 202, 203, 204. Wireless configuration parameters in the local coverage areas 201, 202, 203, 204, 205 may also complement one another in a manner that affects the overall performance of the wireless network. By way of example, the hysteresis margins of neighboring local coverage areas 201, 202, 203 204, 205 may affect mobility load balancing (MLB) and mobility robustness optimization (MRO) performance over the entire wireless network 200.

The controller 290 may be a SON controller configured to generate results (e.g., optimization solutions, diagnoses, predicted values, etc.) by processing information (e.g., measurement reports, KPIs, etc.) received from the APs 210, 220, 230, 240, 250 using various SON techniques. In an embodiment, the controller 290 generates multiple alternative results using alternative SON techniques, and calculates a compromise result between the alternative results based on reputations assigned to the alternative SON techniques.

Figure 3:
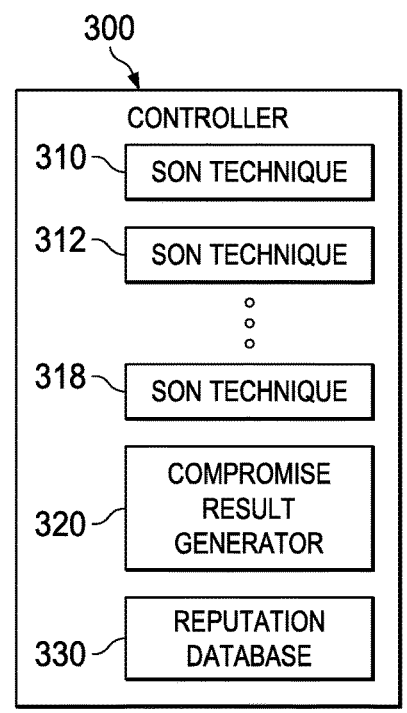
FIG. 3 illustrates a block diagram of an embodiment controller for calculating a compromise result between alternative results based on reputations of alternative SON techniques used to generate the alternative results.

FIG. 3 illustrates a diagram of an embodiment controller 300 for calculating a compromise result between alternative results generated using different SON techniques 310, 312, 318. In this example, the embodiment controller 300 generates alternative results using the SON techniques 310, 312, 318. Thereafter, a compromise result generator 320 calculates a compromise result from the alternative results based on reputations assigned to the SON techniques 310, 312, 318. The reputations may be stored, and updated, in the reputation database 320.

Figure 4:
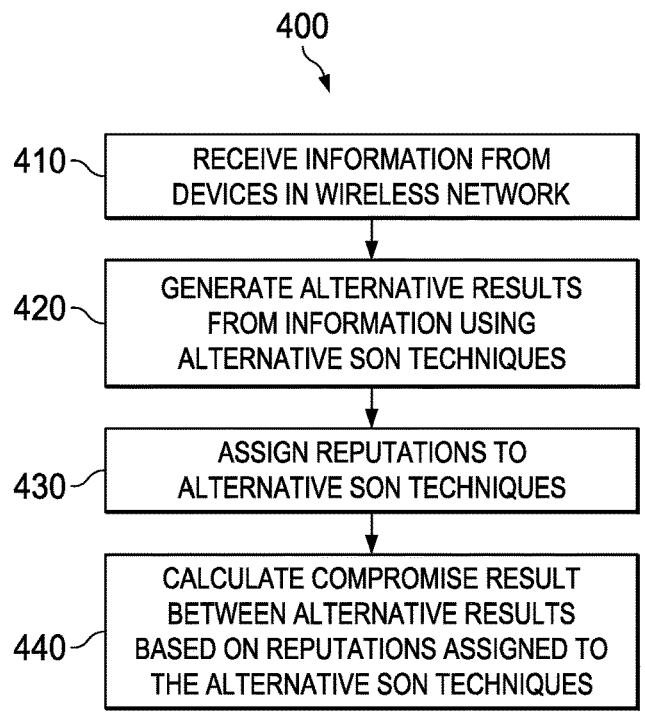
FIG. 4 illustrates a flowchart of an embodiment method for generating a compromise result between alternative results based on reputations assigned to alternative SON techniques used to generate the alternative results.

FIG. 4 illustrates an embodiment method 400 for generating a compromise result between alternative results based on reputations assigned to alternative SON techniques used to generate the alternative results, as may be performed by a controller. At step 410, the controller receives information from devices in a wireless network. The information may have been generated during an initial period. At step 420, the controller generates alternative results from the information using alternative SON techniques. At step 430, the controller assigns reputations to the alternative SON techniques. In some embodiments, the SON techniques are pre-assigned reputations, in which case step 430 is omitted. In some embodiments, reputations may be assigned to SON techniques dynamically based on the online feedbacks from the network for previous solutions generated by SON techniques. At step 440, the controller calculates a compromise result between the alternative results based on the reputations assigned to the alternative SON techniques.

Figure 5:
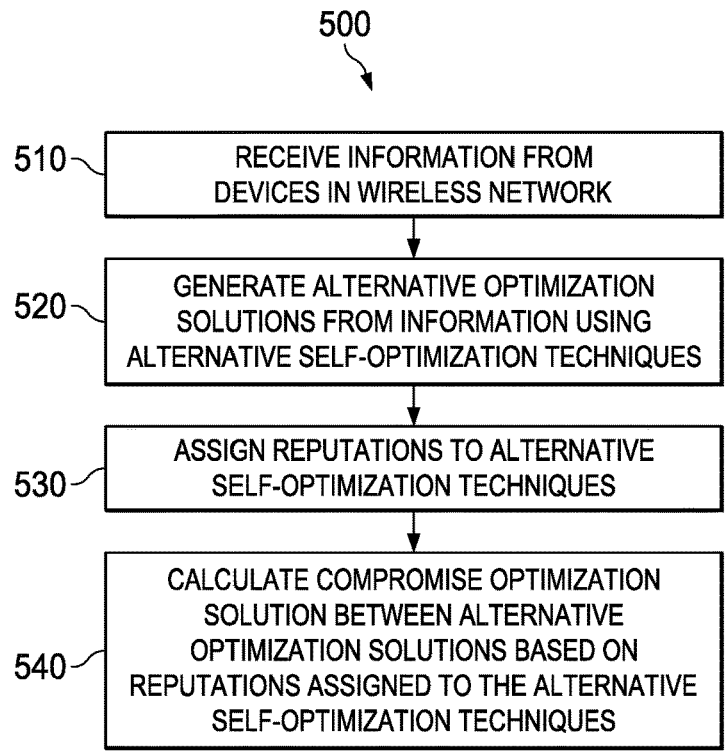
FIG. 5 illustrates a flowchart of an embodiment method for generating a compromise optimization solution between alternative optimization solutions based on reputations assigned to alternative self-optimization techniques used to generate the alternative optimization solutions.

In an embodiment, the controller calculates a compromise optimization solution between alternative optimization solutions based on reputations assigned to self-optimization techniques used to generate the respective optimization solutions. FIG. 5 illustrates an embodiment method 500 for generating a compromise optimization solution from alternative optimization solutions based on reputations assigned to alternative self-optimization techniques used to generate the alternative optimization solutions, as may be performed by a controller. At step 510, the controller receives information from devices in a wireless network. The information may have been generated during an initial period. At step 520, the controller generates alternative optimization solutions from the information using alternative self-optimization techniques. The optimization solutions may specify adjustments, or initial values, for one or more wireless configuration parameters in a wireless network. The self-optimization techniques may generally be designed to determine how to adjust wireless parameters in a manner that seeks to alleviate, or otherwise improve a performance metric associated with, a specific self-optimization problem. Table 1 provides examples of wireless configuration parameters that may be adjusted to address different self-optimization problems. At step 530, the controller assigns reputations to the alternative self-optimization techniques. In some embodiments, the self-optimization techniques are pre-assigned reputations, in which case step 530 is omitted. In some embodiments, reputations may be assigned to self-optimization techniques dynamically based on the online feedbacks from the network for previous solutions generated by self-optimization techniques. At step 540, the controller calculates a compromise optimization solution between the alternative optimization solutions based on the reputations assigned to the alternative self-optimization techniques.

TABLE 1

| Optimization Problem | Wireless configuration parameters |
| --- | --- |
| Coverage Capacity Optimization (CCO) | RFs (e.g., antenna tilt, azimuth), transmit power |
| Inter-cell-interference Coordination (ICIC) | sub-band power factor, edge-to-center boundary, power, RF (e.g., tilt) |
| Mobility Load Balancing (MLB) | pilot power, RFs (e.g., tilt), Handover parameters (e.g., hysteresis, cell individual offset) |
| Mobility Robustness Optimization (MRO) | pilot power, RFs (e.g., tilt), Handover parameters (e.g., hysteresis, cell individual offset) |
| Cell Outage Compensation (COD) | RFs (e.g., antenna tilt, azimuth), transmit power |

Figure 6:
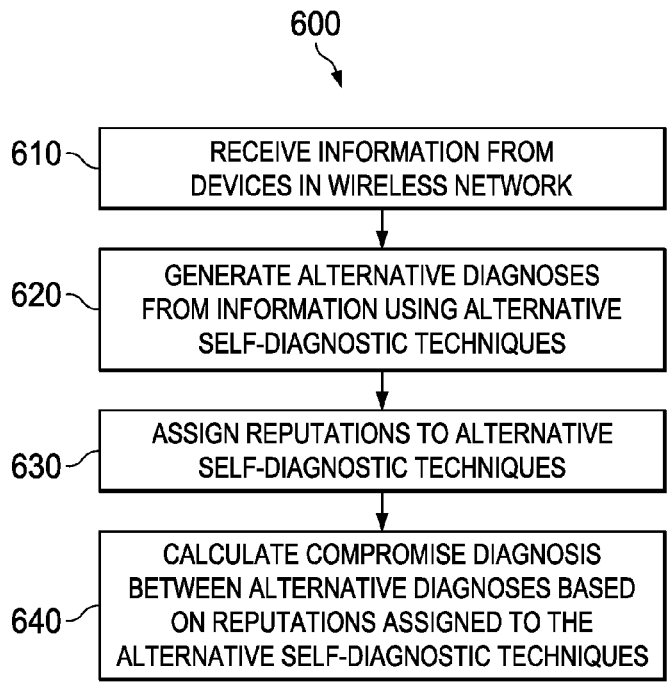
FIG. 6 illustrates a flowchart of an embodiment method for generating a compromise diagnosis between alternative diagnoses based on reputations assigned to alternative self-diagnostic techniques used to generate the alternative diagnoses.

In another embodiment, the controller calculates a compromise diagnoses between alternative diagnoses based on reputations assigned to self-diagnostic techniques used to generate the respective diagnoses. FIG. 6 illustrates an embodiment method 600 for generating a compromise diagnosis from alternative diagnoses based on reputations assigned to alternative self-diagnostic techniques used to generate the alternative diagnoses, as may be performed by a controller. At step 610, the controller receives information from devices in a wireless network. The information may have been generated during an initial period. At step 620, the controller generates alternative diagnoses from the information using alternative self-diagnostic techniques. The alternative diagnoses may specify different underlying causes for a quality or performance problem experienced by the network during a previous period. The alternative self-diagnostic techniques may specify different ways of evaluating the information provided by the devices and/or other information (e.g., information about the network topology, environmental conditions, etc.) in order to determine the underlying cause (e.g., root cause) of the quality or performance problem. By way of example, diagnostic problems may seek to identify which device, or cell, is responsible for a cell outage or network failure. In some embodiments, self-diagnostic techniques also provide self-healing functionality by identifying recovery actions to execute based on the diagnosis. Table 2 provides descriptions of a few self-diagnostic problems. At step 630, the controller assigns reputations to the alternative self-diagnostic techniques. In some embodiments, the self-diagnostic techniques are pre-assigned reputations, in which case step 630 is omitted. In some embodiments, reputations may be assigned to self-diagnostic techniques dynamically based on the online feedbacks from the network for previous solutions generated by self-diagnostic techniques. At step 640, the controller calculates a compromise diagnosis between the alternative diagnoses based on the reputations assigned to the alternative self-diagnostic techniques.

TABLE 2

| Self-Diagnostic/Healing Problem | Description |
| --- | --- |
| Cell Outage Detection | Remotely detect cell outage |
| Anomaly Detection | Detect anomaly (e.g., abnormal KPIs) |
| Root Cause Analysis | Identify the root cause associated with the a detected anomaly (e.g., coverage or interference problem for unsatisfied or degraded KPIs, root cause for heavy loaded cells) |

Figure 7:
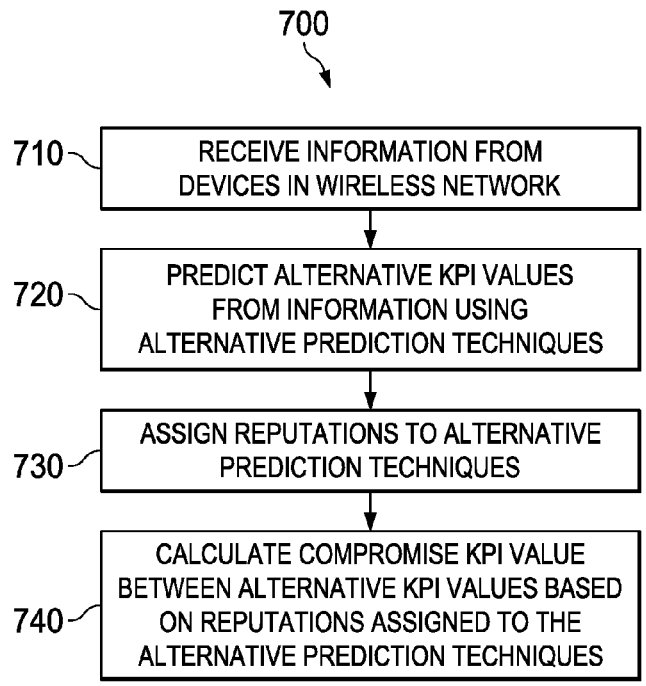
FIG. 7 illustrates a flowchart of an embodiment method for generating a compromise KPI value from alternative KPI values based on reputations assigned to alternative prediction techniques used to predict the KPI values.

In yet another embodiment, the controller calculates a compromise value (e.g., KPI, UE location, etc.) between predicted values based on reputations assigned to prediction techniques used to predict the respective values of interest. FIG. 7 illustrates an embodiment method 700 for generating a compromise KPI value from alternative KPI values based on reputations assigned to alternative prediction techniques used to predict the KPI values, as may be performed by a controller. At step 710, the controller receives information from devices in a wireless network. The information may have been generated during an initial period. At step 720, the controller predicts alternative KPI values from the information using alternative prediction techniques. A KPI may be any specific performance metric of a wireless network. In some embodiments, KPIs may have a causal or correlative relationship with quality metrics (e.g., key quality indicators (KQIs) used to gauge the quality of service/experience collectively observed by users/devices in a wireless network. By way of example, the perceived quality of voice traffic may be largely dependent on to uplink packet loss rates, which may be highly correlated to KPIs indicative of interference and path loss. Table 3 identifies examples of KPIs that are related to uplink packet loss rates. Those of ordinary skill in the art will appreciate that other KPIs may be related to other quality metrics. At step 730, the controller assigns reputations to the alternative prediction techniques. In some embodiments, the prediction techniques are pre-assigned reputations, in which case step 730 is omitted. In some embodiments, reputations may be assigned to prediction techniques dynamically based on the online feedbacks from the network for previous predicted values generated by prediction techniques. At step 740, the controller calculates a compromise KPI value between the alternative KPI values based on the reputations assigned to the alternative prediction techniques.

TABLE 3

| KPI | Description |
| --- | --- |
| Avg.PUSCH.Inteference | Average physical uplink shared channel interference |
| Avg.PUCCH.Inteference | Average physical uplink control channel interference |
| Avg.PUCCH.Rsrp | Average physical uplink control channel RSRP |
| Avg.PUSCH.Rsrp | Average physical uplink shared channel RSRP |
| DL.PDSCH.DTX.Rate | Downlink physical share channel discontinuous transmission rate |
| UL.CCE.Alloc.Fail.Rate | Uplink control channel element allocation failure rate |

TABLE 3-continued

| KPI | Description |
|---|---|
| DL.CCE.Alloc.Fail.Rate | Downlink control channel element allocation failure rate |
| DMRS.Scheduling.Num | Number of times demodulation reference signal scheduled |
| Sleep.TTI.Rate | Transmission Time Interval in sleep state rate |
| DMRS.Scheduling.Rate | Demodulation reference signal scheduled Rate |
| Intra.eNB.Intra.Freq.HO | Intra-eNodeB intra-frequency handover |
| Intra.eNB.Inter.Freq.HO | Intra-eNodeB inter-frequency handover |
| Inter.eNB.Intra.Freq.HO | Inter-eNodeB intra-frequency handover |
| Inter.eNB.Inter.Freq.HO | Inter-eNodeB inter-frequency handover |
| Intra.eNB.Inter.FDDTDD.HO | Intra-eNodeB inter-FDD or inter-TDD handover |
| Inter.eNB.Inter.FDDTDD.HO | Inter-eNodeB inter-FDD or inter-TDD handover |
| UL.CCE.Use.Rate | Uplink control channel element usage rate |
| DL.CCE.Use.Rate | Downlink control channel element usage rate |
| CCE.Use.Rate | Control channel element usage rate |
| DL.SRB.CCE.Use.Rate | Downlink signaling radio bearer control channel element usage rate |

Figure 8:
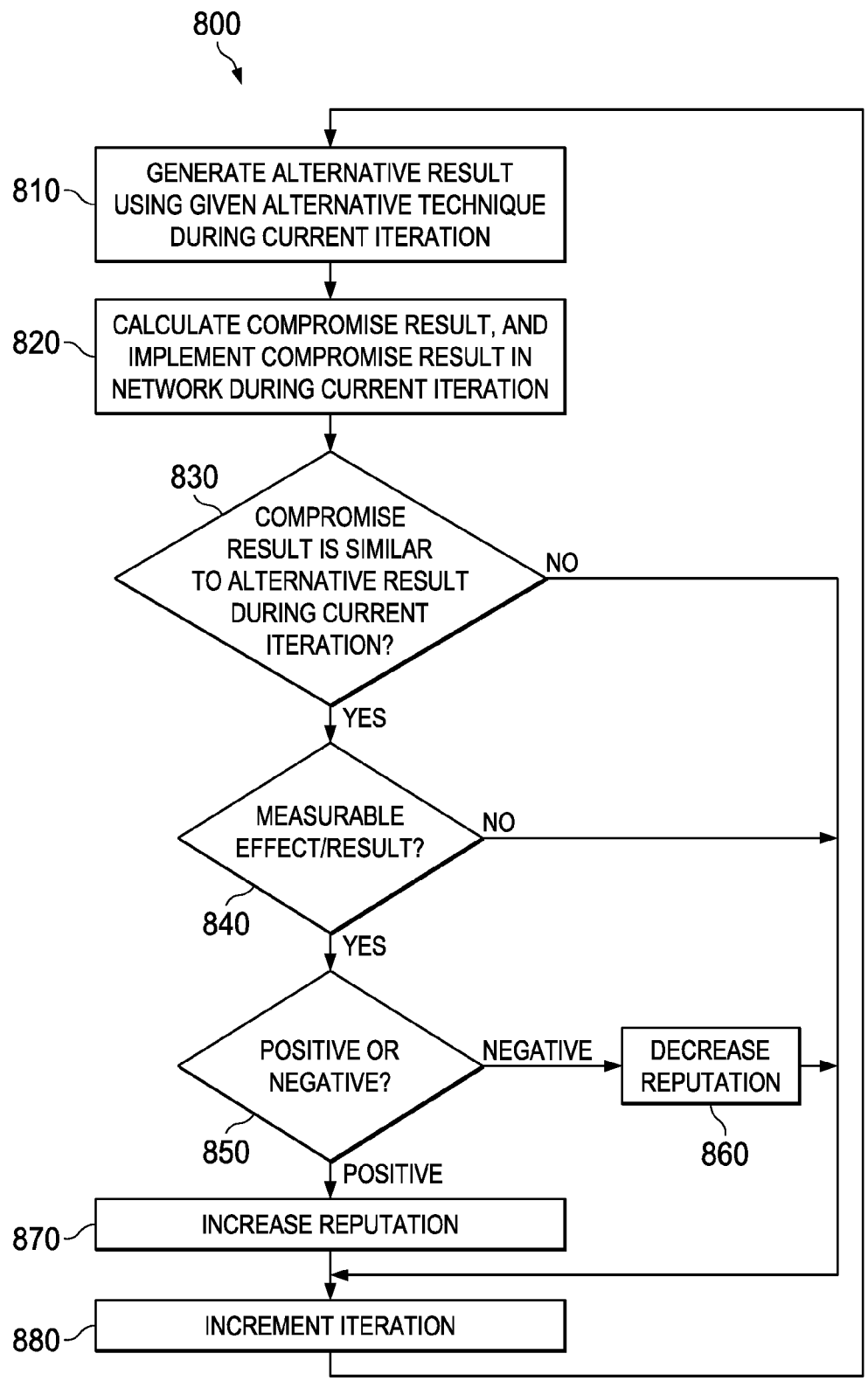
FIG. 8 illustrates a flowchart of an embodiment method for assigning reputations to alternative SON techniques based on the efficacy of previous results generated by the alternative SON techniques, as may be performed by a controller.

Various methods may be used to assign reputations to alternative SON techniques. For example, reputations may be assigned to alternative SON techniques based on the efficacy of previous results generated by the alternative SON techniques. In one embodiment, the reputation of a given SON technique is incremented or decremented based upon whether a previous result generated by the given SON technique positively or negatively impacted a corresponding quality/performance metric. FIG. 8 illustrates a flowchart of an embodiment method 800 for assigning reputations to alternative SON techniques based on the efficacy of previous results generated by the alternative SON techniques, as may be performed by a controller. At step 810, the controller generates an alternative result using alternative technique during a current iteration. At step 820, the controller calculates a compromise result, and implements the compromise result in the wireless network during the current iteration. Implementing a compromise result in a wireless network may include any actions taken to adjust, re-configure, remove, replace, or evaluate devices in the wireless network. For example, if the compromise result is an optimization solution, then implementation may include adjusting one or more wireless configuration parameters of one or more devices (e.g., APs) in the wireless network. As another example, if the compromise result is a diagnosis identifying an underlying cause of a quality/performance problem, then implementation may include any steps taken to determine whether the detected anomaly is actually existing or not, or whether the identified cause is actually contributing the quality/performance problem. In the context of cell outage detection, implementation of the diagnosis may include sending out a technician to confirm whether an identified cell is functioning properly. As another example, if the compromise result is a predicted KPI value for a future period, then implementation may entail waiting for the future period to occur, and determining whether the predicted KPI value is within a threshold (e.g., a range) of a KPI measurement during the future period.

At step 830, the controller determines whether the compromise result is the same as, or substantially similar to, the alternative result generated by the given alternative SON technique. In some embodiments, the compromise result must be identical to the alternative result generated by the given alternative SON technique for the controller to determine "yes" at step 830. In other embodiments, a parameter of the compromise result must be within a threshold of a parameter of the alternative result generated by the given alternative SON technique for the controller to determine "yes" at step 830. By way of example, the controller to determine "yes" at step 830 when the compromise result and the alternative result are predicted KPI values within a certain ranges. In yet other embodiments, the controller may infer the efficacy of an alternative result that is opposite from the compromise result when a quality/performance metric is significantly impacted by implementation of the compromise result. By way of example, if the alternative result indicates that an antenna tilt should be increased, and the compromise result that is implemented in the network decreases the antenna tilt, then a significant improvement in a corresponding quality/performance metric following implementation of the compromise solution may be used to infer that the alternative result would have adversely affected the quality/performance metric, while a significant adverse effect following implementation of the compromise solution may be used to infer that the alternative result would have positively affected the quality/performance metric.

If the compromise result is not the same as, or substantially similar to, the alternative result, then the controller proceeds to next iteration at step 880, and the method 800 reverts back to step 810. If the compromise result is the same as or substantially similar to the alternative result, then the controller determines whether there was a measurable effect/result from implementing the compromise effect/result in the wireless network during the current iteration. In an embodiment, the controller determines that there was a measurable effect/result when implementing the compromise solution causes a quality/performance metric to change by more than a threshold. In another embodiment, the controller determines that there was a measurable effect/result when a subsequent evaluation of diagnosis specified by the compromise solution determined, with a threshold level of confidence, either that a cause specified by the diagnosis was the root cause, or a contributing cause, of a corresponding quality/performance problem or that none of the causes specified by the diagnosis was the root cause, or a contributing cause, of the corresponding quality/performance problem.

If there is not a measureable effect/result from implementation of the compromise effect/result, then the controller proceeds to next iteration at step 880, and the method 800 reverts back to step 810. If there was a measurable effect/result from implementation of the compromise effect/result, then the controller determines whether the affect/result was positive or negative at step 850. If the affect/result was negative, then the controller decreases the reputation of the alternative technique at step 860. If the affect/result was positive, then the controller increases the reputation of the alternative technique at step 870. In an embodiment, the controller determines that the effect/result was positive when the quality/performance metric was positively affected (e.g., cost metric reduced, utility metric increased, etc.) and negative when the quality/performance metric was negatively affected (e.g., cost metric reduced, utility metric increased, etc.). In another embodiment, the controller determines that the effect/result was positive when a cause specified by the compromise diagnosis was the root cause, or a contributing cause, of a corresponding quality/performance problem, and that the effect/result was negative when none of the causes specified by the diagnosis was the root cause, or a contributing cause, of the corresponding quality/performance problem. In another embodiment, the controller determines that the effect/result was positive when a predicted KPI value for a future period is within a threshold range of a KPI value measured, or otherwise obtained from information gathered, during the future period, and that the effect/result was negative when a predicted KPI value for a future period is outside a threshold range of a KPI value measured, or otherwise obtained from information gathered, during the future period. After decreasing or increasing the reputation, the controller proceeds to the next iteration at step 880, and the method 800 reverts back to step 810. As an example for self-optimization or self-healing, alternative technique 1 and 2 may suggest +1 for tilt of cell 1, alternative technique 3 suggests −1 for tilt of same cell, then +1 may be taken as the final action based on majority vote (2 alternative technique suggest +1 for tilt of cell 1), and if we see positive gain (based on some cost functions related to particular SON problem, or KPIs), we may reward +1 to the reliability/reputation for both alternative technique 1 and 2, and penalize −1 for alternative technique 3. If we see negative gain, then we may reward +1 to agent 3, and penalize −1 for alternative technique 1 and 2. Then we may either calculate or update the reputation based on the rewards and penalties received for each alternative technique over a group of entities (e.g., cells, market) during a time period. As another example for self-diagnosis, alternative technique 1 may identify cell 1 as abnormal cell based on relevant online feedback from the network (e.g., KPIs, MR), while alternative technique 2 may label cell 1 as normal, if alternative technique 1 has higher reputation or reliability than alternative technique 2, we may finally label cell 1 as abnormal. However, if it turns out that cell 1 is actually normal (e.g., engineer find no problem at all for this cell later on), then we use the difference between predicted vs ground truth to calculate some metrics (e.g., classification error rate, confidence level, Bayesian probability, reward, penalty) to either quantify the reputation or adjust it for alternative technique 1 and 2. As another example for self-prediction, alternative technique 1 may predict a value for KPI (e.g., throughput or load to be occurred in half hour later) for cell 1 or UE location for UE 1, alternative technique 2 predicts another value. If the actually measured KPI or UE location is quite different from value predicted by alternative technique 1 but close to that from alternative technique 2, then we may use the difference between predicted value and measured value for a group of interested entities (e.g., cells, UEs) to calculate some metrics (e.g., confidence level, prediction error, reward, penalty) to either quantify the reputation or adjust/update the reputation for alternative technique 1 and 2.

Figure 9:
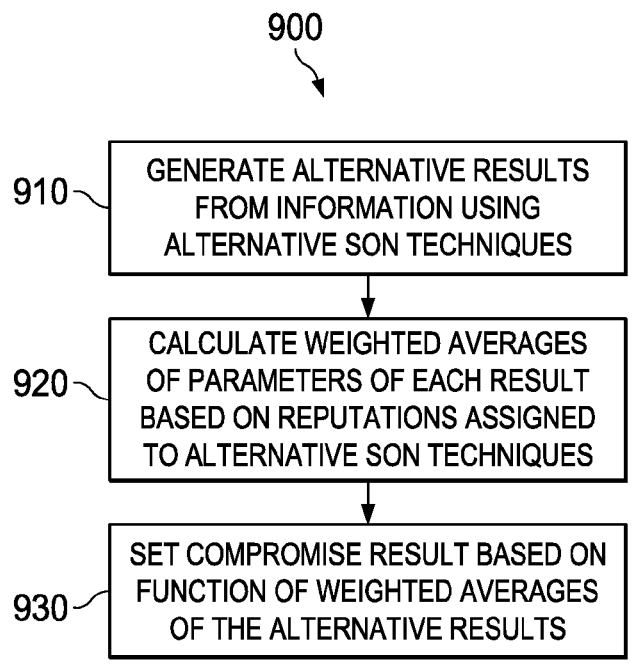
FIG. 9 illustrates a flowchart of an embodiment method for calculating an optimization result based on weighted averages of parameters specified by alternative results.

Various methods may be used to calculate/determine compromise results between alternative results. FIG. 9 illustrates a flowchart of an embodiment method 900 for calculating an optimization result based on weighted averages of parameters specified by alternative results, as may be performed by a controller. At step 910, the controller generates alternative results from information using alternative SON techniques. At step 920, the controller calculates weighted averages of parameters of the results based on reputations assigned to alternative SON techniques. In one embodiment. At step 930, the controller sets a compromise result based on a function of the weighted averages of the parameters specified by the alternative results.

Figure 10:
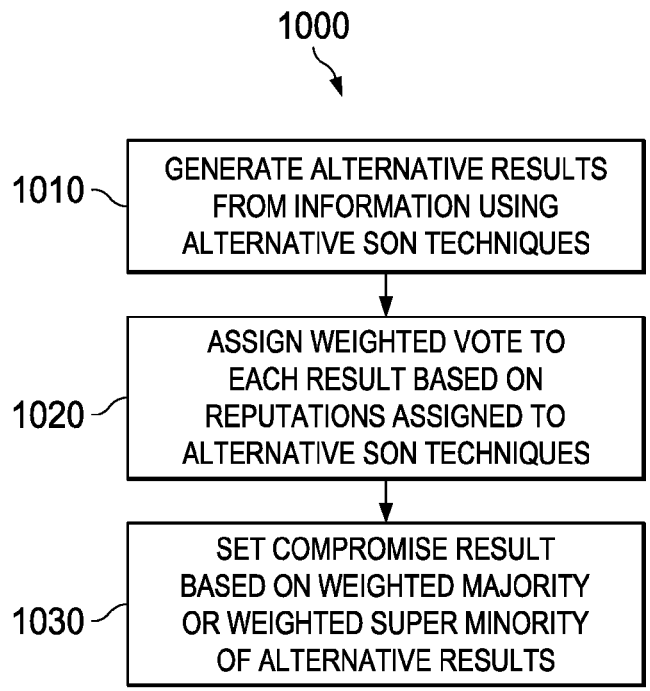
FIG. 10 illustrates a flowchart of an embodiment method for using a weighted consensus approach to calculate an optimization result.

FIG. 10 illustrates a flowchart of an embodiment method 1000 for using a weighted consensus approach to calculate an optimization result. At step 1010, the controller generates alternative results from information using alternative SON techniques. At step 1020, the controller assigns weighted votes to the alternative results based on reputations assigned to alternative SON techniques. At step 1030, the controller sets a compromise result based on a weighted majority or weighted minority of the alternative results.

In one embodiment, a compromise result is calculated based on weighted averages of the alternative results (e.g., solutions, diagnoses, predicted values, etc.), or to parameters specified by the alternative results (e.g., parameter adjustments, underlying causes, KPI values, etc.).

There are multiple SON techniques available for implementing SON strategies, including self-configuration, self-optimization, self-diagnosis, and self-healing. Each SON technique has its own inherent advantages and disadvantages. For example, some agents may perform worse than others at the beginning, but may provide better long-term performance after they have learned the system based on information or feedback collected from the system and have more accurate information (e.g., engineer parameter, propagation model) from which to rely. Each SON technique may use partial information about the system (e.g., network, process, user, environment, situations, conditions) or subsystem, and may act "selfishly" or initiate actions/predictions that may conflict with those of other SON techniques.

Individual SON techniques being implemented in the same network may occasional conflict with each other. Aspects of this disclosure prevent undesirable conflicts by coordinating the actions performed by various SON techniques in operating in the same network environment. The may be particularly beneficial in complicated network environments, e.g., heterogeneous networks (HetNets) having many small cells and/or multiple different access technologies (e.g., 2G/3G/4G), interne of things, software defined networks (SDNs), etc.

Aspects of this disclosure provide a flexible self-learning and self-managing framework capable of swiftly adapting to new and/or changing network environments. Embodiment coordination methods may evaluate the performance of various SON techniques for the same task in various situations. Embodiment coordination methods How to combine the power of various SON techniques in order to, for example, make better decisions, develop a global view, or improved local view, of the system, provide better control and optimization in a complex network. Embodiment coordination schemes may be robust enough to seamlessly handle different network scenarios or situations, as well as self-adapt to unforeseen situations.

Aspects of this disclosure provide an analytics-assistant, multi-agent, self-learning, flexible and adaptive framework for SON implementation. Embodiment coordination schemes may coordinate and combine the power of multiple SON agents. SON agents may comprise a SON application or entity that is adapted to perform a given SON function, operation, technique, method, or simulation in a host network. For example, one SON agent may be adapted to perform self-healing in a network, while another SON agent may be adapted to perform self-optimization in the network.

Aspects of this disclosure may provide automated adaptability to new and fast changing network environments. Embodiments may provide self-learning solution (e.g., decision, evaluation, action, prediction) that benefit from the experiences of multiple SON agents. Embodiments may utilize real-time feedback (e.g., measurement reports (MRs), key performance indicators (KPIs), mistakes, rewards, etc.) as well as data from proactive offline simulations (e.g., Unet, Netlab, Atol, etc.).

Embodiment coordination schemes may continuously and dynamically reevaluate the performance of multiple SON agents based on various criteria for different situations, in order to select the most effective SON techniques, and reduce the influence of weaker SON techniques over time for different scenarios. Embodiment coordination schemes may dynamically re-weigh the effectiveness of multiple SON agents, and adapt the confidence to them accordingly. Embodiment coordination schemes may improve performance and robustness by combining results, prediction and/or actions of multiple SON agents. Embodiment coordination schemes may provide stability and elasticity in order to, for example, tolerate inaccurate and/or incomplete information from various situations or complicated networks e.g., inaccurate engineering parameters, missing or inaccurate UE location information, etc.

Embodiment coordination schemes may calibrate, estimate and predict information of interest (e.g., inaccurate engineering parameters, UE location, cell labeling, KPIs, KQIs, cell outage detection) by combining the advantages of multiple SON agents and big data.

Figure 11:
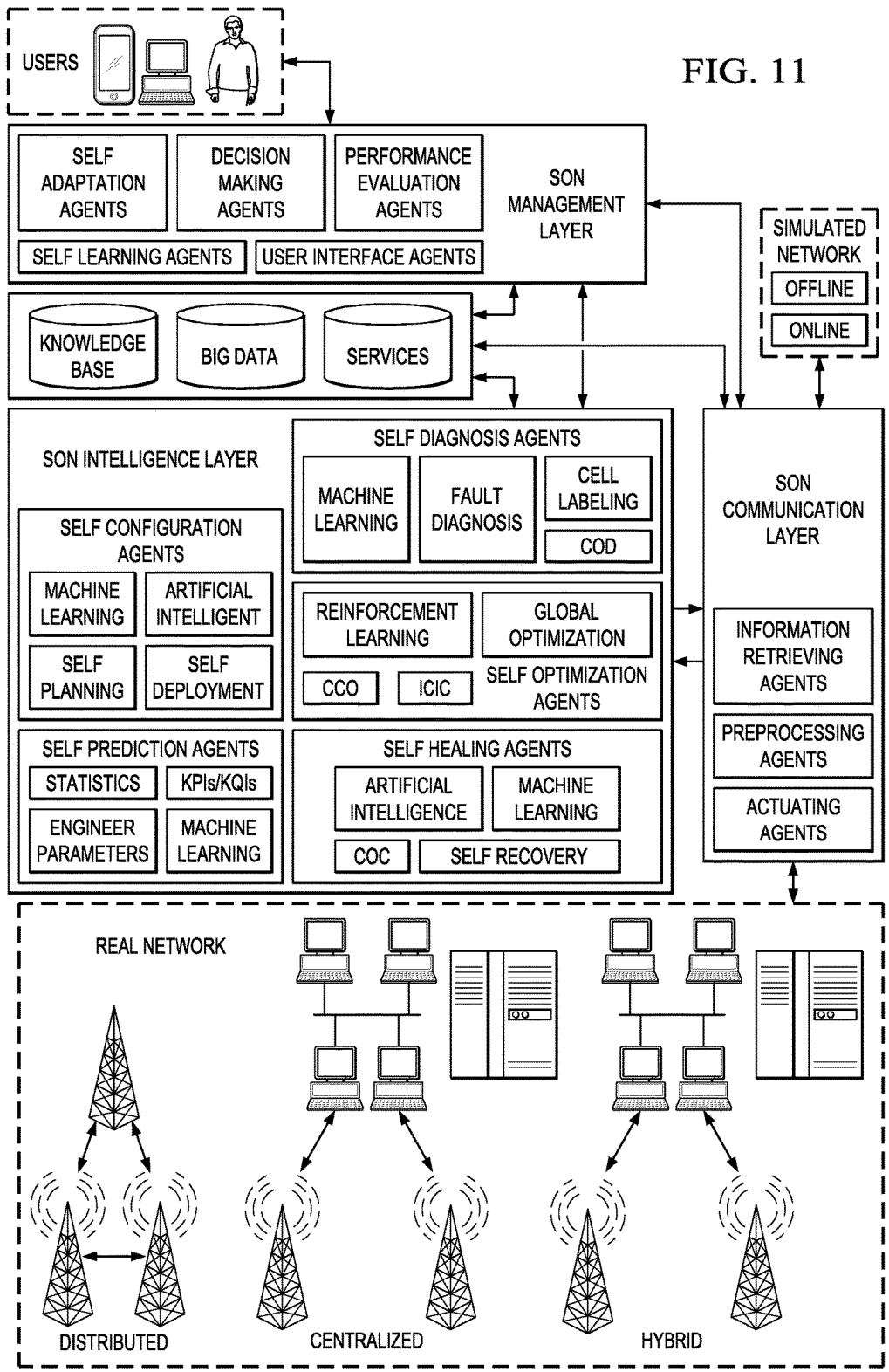
FIG. 11 illustrates a diagram of an embodiment framework for coordinating the behavior of multiple SON agents implemented in the same network.

FIG. 11 illustrates an embodiment framework for coordinating the behavior of multiple SON agents operating in a common network. In an embodiment, this framework provides an analytics-assisted, multi-agents, self-learning, and adaptive framework for SON. As shown, the embodiment framework includes a SON management layer, a SON intelligence layer, and a SON communication layer.

Agents in different modules of the SON communication layer may interact with system components (e.g., real network, process, UEs, environment, simulators, database, knowledge base) and/or third party services. The modules may, inter alia, retrieve relevant information for pre-processing and/or post-processing, make changes to the system, and update information in a database or a knowledge base of a system component or third party device.

Agents in the same module may perform one or more module-dependent tasks. In some embodiments, each task can be performed by one or more agents. Agents in the SON communication layer may collaborate with agents in other layers (e.g., SON Intelligence Layer, SON Management Layer) to perform various tasks, including, inter alia, to interact with the system, subsystem and/or online/offline simulators, to self evaluate performance of various agents, to select best performing agents for specific types of tasks or actions or situations, to self adjust weights and/or confidence to each competing agent for the same task under various situations or conditions over time, to self learn and/or self train from feedback of the system, to use online/offline simulation to select the best action to be applied to the system and compete with other agents, to simulate/predict the effect of any actions (e.g., actions suggested by agents in different layers) before taking these actions, and to perform pre-processing or post-processing on relevant information to be used by agents in other layers.

The SON communication layer may include information retrieving agents. The information retrieving agents may retrieve relevant information (e.g., data, feedback) from the system (e.g., user, real networks, simulator, process, environment), and/or 3rd party services (e.g., social network, cloud services, search engine), in order to, e.g., monitor the system, collect and provide data/feedback for agents in other layers. Different information retrieving agents may retrieve relevant information from one or more sensors, probes (e.g., virtual probes in SDN or NFV), parts/units/sections, or levels of the system, 3rd parties, and provide various local or global views of the whole system One or more agents may be available to retrieve the same information, or similar information, e.g. information relating to the same part or level, the same type of information, etc. Information retrieving agents may also supply or update information in the database and/or the knowledge base, as well as provide services to third parties.

The SON communication layer may also include pre-processing agents. Pre-processing agents may Pre-processing agents may preprocess information retrieved from one or more monitoring agents to, for example, check for outliers, filter or estimate missing data, and validate sensor data. Pre-processing agents may perform post-processing on information generated by agents in other layers. Pre-processing agents may use one or more methods to extract and validate various levels or types of information (e.g., statistics) about the system. Pre-processing agents may be available to retrieve the same information, or similar information, e.g. information relating to the same part or level, the same type of information, etc.

The SON communication layer may also include actuating agents. Actuating agents may execute relevant actions in order to make changes to the system, e.g., apply new configuration to the system, retrieve new version of software, record relevant information into the database, schedule monitoring agents to run. Actuating agents may also collaborate with agents in different modules and layers for various tasks, including, inter alia, to select the appropriate control strategies or agents for different situations or states/conditions of system, to adapt to new type of situations/conditions through online/offline simulation, to evaluate the performance of actions taken by agents, and to learn and adapt based on historical actions and/or performance.

Agents in different module of the SON intelligence layer may use various methods (e.g., machine learning, artificial intelligence, statistics, optimization, expert system) to analyze information, detect/diagnose problems with system, pinpoint root causes, make prediction or decision, optimize, control and adapt to the system. Agents in the SON intelligence layer may interact with agents in the SON communication layer to communicate with the real/simulated network. Agents in this layer may collaborate with agents in other layers to perform various tasks, e.g., to evaluate performance of each agent, to select best performing agents for specific types of actions or tasks or situations, to adjust weights and/or confidence to each competing agent for the same task over time, to learn from feedback of the system, to re-train or refine the models used in each agent in real time by incorporating newly collected information from the system or $3^{rd}$ parties, to use online/offline simulation to select the best action to be applied to the system and compete with other agents, and to simulate/predict the effect of any action (e.g., actions suggested by agents in different layers) before taking these actions. Intelligence and adaptation is provided at the agent, module and system levels Each agent in the same module may use various methods (e.g., machine learning, statistics, artificial intelligence, optimization, reinforcement learning, expert system) to perform one or more module-dependent tasks. Agents in the same or different modules and/or layers may collaborate and/or coordinate each other to perform one or more tasks, or compete with each other to satisfy one or more local or global objectives. Multiple agents can be used to perform a specific task, in order to not only improve the performance by consensus-decision making, but also reduce the influence of the weaker agents over time. Agents in the SON intelligence layer can tolerate inaccurate and/or incomplete information from various situations or complicated network (e.g., inaccurate engineering parameters, missing or inaccurate UE location information).

The SON intelligence layer may include self configuration agents. Self configuration agents may perform self planning (e.g., derive appropriate settings for every new network node), and self deployment (e.g., prepare, install, authenticate and verify every new network node) tasks.

The SON intelligence layer may further include self-diagnosis agents. Self-diagnosis agents may proactively detect or diagnose problems with the system, and pinpoint root causes, such as, cell labeling, fault detection/diagnosis, connection oriented data (COD), identification of cells to be adjusted in SON, etc. Self diagnosis agents may collaborate with agents in other modules (e.g., self-configuration, self-optimization, self-healing, and self-prediction) in various layers to perform context dependent tasks.

The SON intelligence layer may further include self-prediction agents. Self-prediction agents may use various methods to perform estimation, calibration, and prediction tasks, e.g., to calibrate inaccurate engineering parameters, to estimate UE locations, to predict KPIs/KQIs/Traffic, etc.

The SON intelligence layer may further include self-optimization agents. Self-optimization agents may automatically take appropriate actions (e.g., change of RF configuration) in various situations (e.g., different operational states of network) to achieve one or more goals (e.g., better performance, lower CAPEX), based on the feedback, e.g., change of KPIs/KQIs or MR after actions being taken) from the environment. Self optimization agents may collaborate with agents in other modules or layers to do various online or offline simulations via one or more simulators before taking actions to the real network, in order to, e.g., find out the best action through simulations and compete with other agents, investigate effect of actions suggested by other agents, etc.

The SON intelligence layer may further include self-healing agents. Self-healing agents may execute appropriate actions (e.g., change of network setting) to keep the system operational and/or prevent disruptive problems from arising. Self-healing agents may be triggered by the self-diagnosis agents when problems are identified.

Agents in the SON management layer use various methods, tools, metrics, and/or criteria (e.g., machine learning, artificial intelligence, reinforcement learning, probability and statistics, optimization, expert system) to monitor the performance of agents in the SON intelligence layer under specific states of systems or subsystem over the time, as well as to evaluate or rate their performance, and adjust weights and/or priorities and/or confidence levels to those agents based past performance under similar conditions or states or situations.

Agents in the SON management layer may collaborate with one or more agents in other layers to perform context dependent task, such as to overcome the shortcomings of relying on a single intelligence or communication agent for a specific task, to achieve better overall performance than if these agents were used independently, to dynamically identify the best performing intelligence agents/methods, to provide accurate results by using agent performance evaluation and performance-based consensus, and to adapt the reliance to different agents in a context dependent way based on prior experience and recursive assessment of performance. Agents in the SON management layer may also interact with users to manage the agents, criteria, metrics, strategies, policies, tunable parameters, settings, preference, tools and methods in different layers. Each agent in the same module may perform one or more module-dependent tasks Agents in the same or different modules in various layers may collaborate and/or coordinate each other to perform one or more tasks. Agents in the SON management layer can collaborate with agents in different layers to self learn, self manage, and self adapt to any new types of situations or new changes in the structure or environment that are not considered or expected before (e.g., situations or conditions not considered by the agents in the design or early phase, rules or conditions not included in knowledge base) in order to achieve universality, robustness, and adaptivity.

The SON management layer may include decision making agents. The decision making agents may collaborate with each other and/or agents in other layers to make decisions (e.g., select best performing agent, combine decisions/actions from multiple agents) and to perform context dependent tasks (e.g., information retrieving, preprocessing, actuating, self-x). Various machine learning or statistics or artificial intelligence or SON techniques or methods or criteria can be used by agents for decision making, such as, majority vote from multiple agents, weighted consensus, Bayesian probability based strategy, reinforcement learning, past history of performance of each agent over a time period, thresholds, probability (e.g., Metropolis criterion), etc. Decision making agents may use online/offline simulation, knowledge base, and/or 3rd party services to learn the best decision for various agents under various situation, simulate/predict the effect of decision being or to be used for agents in different layers, etc. Decision making may be performed at various levels for various tasks under various situations, such as, system level (e.g., overall decision of the whole solutions suggested by all agents), subsystem level (e.g., decision of subgroup of solutions or subgroup of components of solutions suggested by all or subgroup of agents), level of each component of the solution (e.g., a solution may include power suggestion for 30 cells, decision may be made at cell level for all solutions suggested by all agents).

The SON management layer may further include performance evaluation agents. The performance evaluation agents may collaborate with each other and/or agents in other layers to dynamically reevaluate performance of each agent or strategy in various situations or state of system, based on the relevant information (e.g., real time feedback from the system, prior information, past history, online/offline simulation, policy or preference from operator, info from $3^{rd}$ parties) over time. Various machine learning or statistics or artificial intelligence or SON techniques or methods or criteria can be used by agents for performance evaluation, such as, instantaneous performance reward or penalty, accumulated reward/penalty over time, reinforcement learning, Bayesian probability based strategy, thresholds, probability (e.g., Metropolis criterion), etc. Performance evaluation agents may use online/offline simulation, knowledge base, and/or $3^{rd}$ party services to evaluate the performance of various agents for various tasks under various situation, simulate/predict the effect of performance evaluation being or to be used for agents in different layers, etc.

Performance evaluation agents may also collaborate with other agents (e.g., decision making agent, pre/post processing agent, simulators) to, for example, evaluate the performance of other agents during a probation period, e.g., to assess performance of new agent along with other working agents for various tasks under different situations before adding the new agent to the pool of working agents. Performance evaluation agents may also collaborate with other agents to process the feedback from the system, calculate a reward/penalty accordingly (e.g., performance agent may calculate the reward/penalty for each agent according to the feedback from the system as well as the similarity between the solution chosen from all agents by decision making agent and the solution suggested by each agent), and supply relevant information (e.g., negative gain/feedback for agent who made wrong suggestion no matter the feedback/gain from the system is negative or positive) to various agents as feedback for learning and updating their own models (e.g., some agents may need to remember and learn from the past history of system feedback to make better decision for new solution). Performance evaluations may be performed at various levels for various tasks under various situations, such as, system level (e.g., overall evaluation of the whole solution suggested by each agent), subsystem level (e.g., evaluation of subgroup of solutions or subgroup of components of the solution suggested by each agent), level of each component of the solution (e.g., a solution may include eTilt suggestion for 30 cells, evaluation may be performed at cell level for each agent).

The SON management layer may further include self-learning agents. The self-learning agents may collaborate with each other and/or agents in various SON layers to update or re-train or refine the models (e.g., update the propagation model used in simulators, retrain the prediction or classification or clustering model) used in agent in different layers in real time by incorporating newly collected information from the system or simulated network or 3rd parties. Various machine learning or statistics or artificial intelligence or SON techniques or methods or criteria can be used for agents to self learn. Self learning agents may use online/offline simulation, knowledge/data base, and/or 3rd party services to learn the best action or strategy or agent model for various type of situations or conditions or tasks, and to simulate/predict/estimate the effect of any set of strategies or rules or settings or tunable parameters (e.g., weights, confidences, prior probability, penalty/reward) being or to be used in agents in different layers, etc.)

The SON management layer may further include self-adaptation agents. The self-adaptation agents may collaborate with each other and/or agents in various layers to self learn, self manage, and self adapt to any new types of situations or new changes in the environment that are not considered or expected before (e.g., situations or conditions not considered by the agents in the design or early phase, rules or conditions not included in knowledge base) in order to achieve universality and robustness. Self adaptation agents may use online/offline simulation, knowledge base, and/or $3^{rd}$ party services to learn the best action or strategy or agent for new types of situations or conditions, as well as to simulate/predict the effect of any set of weights or confidences or strategies being used, or to be used, by agents in different layers.

The SON management layer may further include user interface agents. The user interface agents may provide an interface (e.g., GUI, web/mobile app, API) to allow users (e.g., operators, API developers) to interact with agents in various SON layers. These agents may provide create, read, update, delete (CRUD) functions to the users, to allow the users to create, modify, or remove criteria, policies, methods, and/or settings used by various agents, as well as to specify values for tunable parameters, and to specify the prior probability or initial confidence/weight or reward/penalty for relevant agents to start from.

Figure 12:
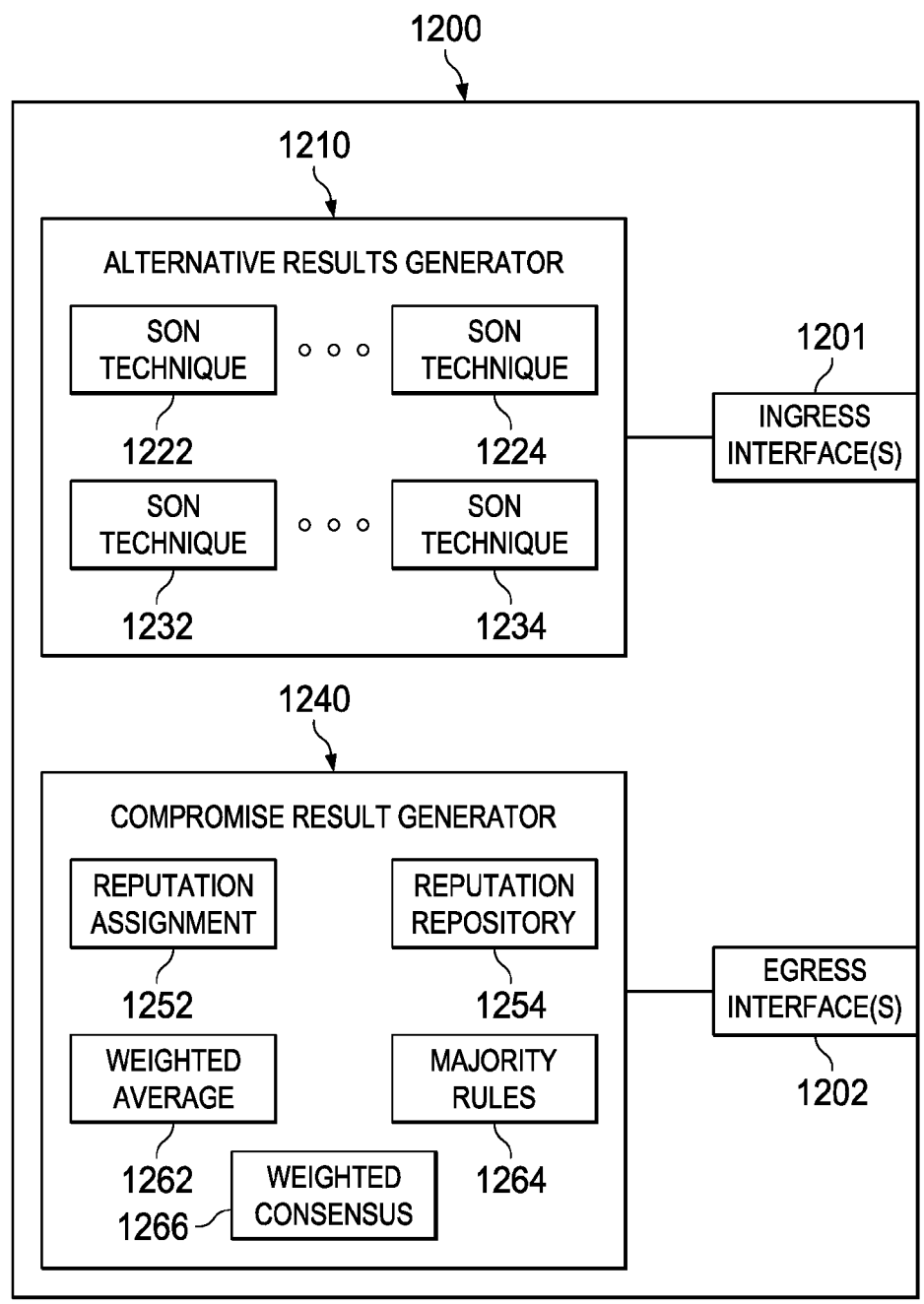
FIG. 12 illustrates a block diagram of an embodiment controller for calculating a compromise result between alternative results based on reputations of alternative SON techniques used to generate the alternative results.

FIG. 12 illustrates a block diagram of an embodiment controller 1200 adapted to generate a compromise result between alternative results. As shown, the embodiment controller 1200 includes one or more ingress interfaces 1201, one or more egress interfaces 1202, an alternative results generator 1210, and a compromise result generator 1240. The one or more ingress interfaces 1201 may be configured to receive information (e.g., measurement reports, etc.) from devices (e.g., APs) in a wireless network, and the one or more egress interfaces 1202 may be configured to send results or instructions to devices (e.g., APs) in the wireless network. The alternative results generator 1210 may include hardware and/or software adapted to generate alternative results using the alternative SON techniques 1222, 1224, 1232, 1234 based at least in part on information received over the one or more ingress interfaces 1201. The SON techniques 1222, 1224, 1232, 1234 may utilize different strategies and/or rely on different types of information to generate their respect results. The compromise result generator 1240 may include hardware and/or software adapted to derive a compromise result between the alternative results generated by the alternative results generator 1210. The compromise result generator 1240 may use the reputation assignment unit 1252 to assign and/or update reputations for the SON techniques 1222, 1224, 1232, 1234 stored in the reputation repository. The compromise result generator 1240 may use one of the weighted average unit 1262, the majority rules unit 1264, and the weighted consensus unit 1266 to compute the compromise result between the alternative results based on the reputations assigned to the SON techniques 1222, 1224, 1232, 1234. As mentioned above, components of the embodiment controller 1200 may be hardware, software, or a combination thereof. Each component may be referred to as a unit or module. In one embodiment, one or more components of the embodiment controller 1200 are integrated circuits, such as field programmable gate arrays (FPGAs) or application-specific integrated circuits (ASICs).

Figure 13:
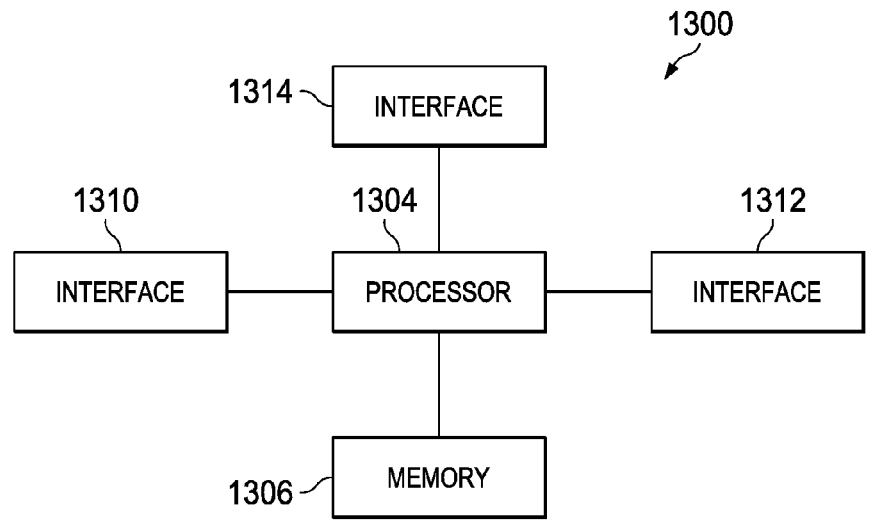
FIG. 13 illustrates a diagram of an embodiment processing system.

FIG. 13 illustrates a block diagram of an embodiment processing system 1300 for performing methods described herein, which may be installed in a host device. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
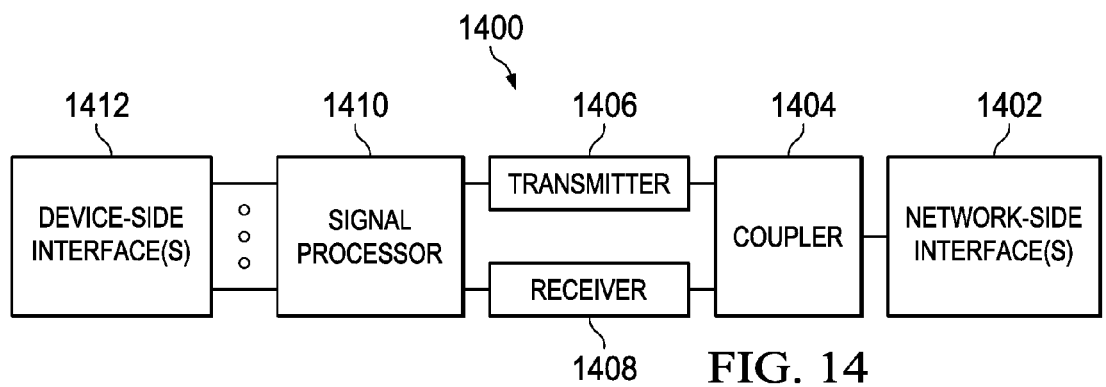
FIG. 14 illustrates a diagram of an embodiment transceiver.

In some embodiments, one or more of the interfaces 1310, 1312, 1314 connects the processing system 1300 to a transceiver adapted to transmit and receive signaling over the telecommunications network. FIG. 14 illustrates a block diagram of a transceiver 1400 adapted to transmit and receive signaling over a telecommunications network. The transceiver 1400 may be installed in a host device. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps. The embodiments of the invention specifically include apparatus and systems configured to perform the described steps, articles of manufacture specifically including non-transitory computer-readable medium such as magnetic and optical disks, storage media including memory, etc., that include computer instructions that, when executed by one or more processors, perform the operations described in the specification and shown in the drawings. All such embodiments and claims specifically, especially those that include non-transitory computer-readable medium, exclude signals.

The following references are related to subject matter of the present application. Each of these references is incorporated herein by reference in its entirety:

Publication entitled "Monitoring, Fault Diagnosis, Fault Tolerant Control and Optimization: Data Driven Methods"

Publication entitled "Monitoring, Analysis and Diagnosis of Distributed Processes with Agent-Based Systems".

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A non-transitory computer-readable medium storing programming for execution by a processor, the programming including instructions to:

obtain information from devices in a wireless network during a first period, the information obtained from wireless communication signals containing quality and performance metrics from the devices;

generate alternative optimization solutions for the wireless network using alternative self-optimization techniques based on the information received during the first period, wherein at least some of the alternative optimization solutions specify different values for adjusting one or more wireless configuration parameters of the wireless network;

calculate a compromise solution between the alternative optimization solutions based on reputations of the alternative self-optimization techniques used to generate the respective alternative optimization solutions; and wirelessly transmit the compromise solution to one or more access points in the wireless network to adjust, re-configure, remove, replace or evaluate devices in the wireless network, the compromise solution being used in the wireless network during a second period;

wherein the programming further includes instructions to assign the reputations to the alternative self-optimization techniques based on an efficacy of previous optimization solutions generated by the alternative self-optimization techniques, the instructions to assign the reputations to the alternative self-optimization techniques based on the efficacy of the previous optimization solutions generated by the alternative self-optimization techniques including instructions to:

increment a reputation of a given self-optimization technique when a previous optimization solution generated by the given self-optimization technique, or a parameter adjustment specified by the previous optimization solution, improves a corresponding quality or performance metric when implemented in the wireless network; and decrement the reputation of the given self-optimization technique when the previous optimization solution, or a parameter adjustment specified by the previous optimization solution, negatively impacts the corresponding quality or performance metric when implemented in the wireless network.

2. The non-transitory computer-readable medium of claim 1, wherein at least some of the alternative optimization solutions are generated based on different types of information generated during the first period.

3. The non-transitory computer-readable medium of claim 1, wherein the instructions to calculate the compromise solution between the alternative optimization solutions based on the reputations of the alternative self-optimization techniques include instructions to:

calculate a weighted average of values for a wireless configuration parameter specified by the alternative optimization solutions based on reputations of the corresponding alternative self-optimization techniques, wherein values in alternative optimization solutions are assigned heavier weights when the alternative optimization solutions are generated by alternative self-optimization techniques having higher reputations than when the alternative optimization solutions are generated by alternative self-optimization techniques having lower reputations; and set the compromise solution to adjust the wireless configuration parameter based on the weighted average of the values specified by the alternative optimization solutions.

4. The non-transitory computer-readable medium of claim 1, wherein the instructions to calculate the compromise solution between the alternative optimization solutions based on the reputations of the alternative self-optimization techniques include instructions to:

determine whether a majority, or a super minority, of the alternative optimization solutions increase, decrease, or maintain a value of a wireless configuration parameter;

set the compromise solution to increase the wireless configuration parameter when a majority, or a super minority, of the alternative optimization solutions increase the wireless configuration parameter;

set the compromise solution to decrease the wireless configuration parameter when a majority, or a super minority, of the alternative optimization solutions decrease the wireless configuration parameter; and set the compromise solution to maintain the value of the wireless configuration parameter when a majority, or a super minority, of the alternative optimization solutions maintain the value of the wireless configuration parameter.

5. The non-transitory computer-readable medium of claim 1, wherein the instructions to calculate the compromise solution between the alternative optimization solutions based on the reputations of the alternative self-optimization techniques include instructions to:

assign weighted votes to the alternative optimization solutions based on the reputations of the corresponding alternative self-optimization techniques used to generate the respective alternative optimization solutions, wherein alternative optimization solutions generated by alternative self-optimization techniques having higher reputations are assigned more heavily weighted votes than alternative optimization solutions generated by alternative self-optimization techniques having lower reputations;

determine whether a weighted majority, or a weighted super minority, of the alternative optimization solutions increase, decrease, or maintain a value of a given wireless configuration parameter;

set the compromise solution to increase the given wireless configuration parameter when a weighted majority, or a weighted super minority, of the alternative optimization solutions increase the given wireless configuration parameter;

set the compromise solution to decrease the given wireless configuration parameter when a weighted majority, or a weighted super minority, of the alternative optimization solutions decrease the given wireless configuration parameter; and set the compromise solution to maintain the value of the given wireless configuration parameter when a weighted majority, or a weighted super minority, of the alternative optimization solutions maintain the value of the given wireless configuration parameter.

6. The non-transitory computer-readable medium of claim 1, wherein at least some of the alternative self-optimization techniques have different reputations than one another.

7. An apparatus comprising:
a processor; and
a non-transitory computer-readable medium storing programming for execution by a processor, the programming including instructions to:
obtain information from devices in a wireless network during a first period, the information obtained from wireless communication signals containing quality and performance metrics from the devices;
generate alternative diagnoses using alternative diagnostic techniques based on the information received from the devices during the first period, wherein at least some of the alternative diagnoses specify different underlying causes for a quality or performance problem in the wireless network;
calculate a compromise diagnosis between the alternative diagnostic techniques based on reputations assigned to the alternative diagnostic techniques used to generate the respective alternative diagnoses; and
reconfigure, during a second period and based on the compromise diagnosis, one or more access points in the wireless network in order to at least partially alleviate the quality or performance problem in the wireless network;
wherein the programming further includes instructions to assign reputations to the alternative diagnostic techniques based on the efficacy of previous diagnoses generated by the alternative diagnostic techniques, the instructions to assign the reputations to the alternative diagnostic techniques based on the efficacy of the previous diagnoses including instructions to:
increment a reputation of a given alternative diagnostic technique when a previous diagnoses generated by the given alternative diagnostic technique is deemed to have correctly identified an underlying cause of the quality or performance problem; and
decrement the reputation of the given alternative diagnostic technique when a previous diagnoses generated by the given alternative diagnostic technique is deemed to have failed to identify an underlying cause of the quality or performance problem.

8. The apparatus of claim 7, wherein at least some of the alternative diagnoses are generated based on different types of information generated during the first period.

9. The apparatus of claim 7, wherein the instructions to calculate the compromise diagnosis between the alternative diagnoses based on the reputations of the alternative techniques include instructions to:
set the compromise diagnosis to identify a cause of the quality or performance problem that is specified by a majority, or a super minority, of the alternative diagnoses.

10. The apparatus of claim 7, wherein the instructions to calculate the compromise diagnosis between the alternative diagnoses based on the reputations of the alternative self-diagnostic techniques include instructions to:
assign a weighted vote to each of the alternative diagnoses based on the reputations of the corresponding alternative self-diagnostic techniques, wherein alternative diagnoses generated by alternative self-diagnostic techniques having higher reputations are assigned more heavily weighted votes than alternative diagnoses generated by alternative self-diagnostic techniques having lower reputations; and
set the compromise diagnosis to identify an underlying cause of the quality or performance problem that is specified by a weighted majority, or a weighted super minority, of the alternative diagnoses.

11. The apparatus of claim 7, wherein at least some of the alternative self-diagnostic techniques have different reputations than one another.

12. A method performed by wireless transceiver containing a processor that executes computer instructions stored in a non-transitory computer-readable medium, comprising:
receiving wireless communication signals containing information from devices in a wireless network during a first period, the information contained in the wireless communication signals including quality and performance metrics from the devices;
predicting alternative values for a future period in a wireless network using alternative prediction techniques based on the information received during the first period, wherein at least some of the alternative values are different than one another;
calculating a compromise value between the alternative values based on reputations of the alternative prediction techniques used to generate the respective alternative values;
assigning the reputations to the alternative prediction techniques based on an efficacy of previous values predicted by the alternative prediction techniques, wherein assigning the reputations to the alternative prediction techniques based on the efficacy of the previous values predicted by the alternative prediction techniques comprises incrementing a reputation of a given alternative prediction technique when a value predicted by the given alternative prediction technique is deemed to have been within a threshold of an actual value; and
adapting, during the future period and based on the compromise value, a wireless configuration parameter of one or more access points in the wireless network.

13. The method of claim 12, wherein calculating the compromise value between the alternative values based on reputations of the alternative prediction techniques comprises:
calculating a weighted average of the alternative values, wherein weights applied to the alternative values are based on reputations of the corresponding prediction techniques; and
setting the compromise value based on the weighted average of the alternative values.

14. The non-transitory computer-readable medium of claim 1, wherein the information obtained from the devices comprises one or more of measurement reports and key performance indicators.

15. The non-transitory computer-readable medium of claim 1, wherein a particular self-optimization technique of the alternative self optimization techniques specifies different values for adjusting one or more wireless configuration parameters of the wireless network to attempt to alleviate a corresponding self-optimization problem.

16. The non-transitory computer-readable medium of claim 15, wherein the one or more wireless configuration parameters for which the particular self-optimization technique specifies different values for adjusting, comprise one or more of the following configuration parameters:
antenna tilt for transmitting radio frequency signals;
azimuth for transmitting radio frequency signals;
transmit power for transmitting radio frequency signals;
sub-band power factor;
edge-to-center boundary;
pilot power; and
handover parameters.

17. The non-transitory computer-readable medium of claim 15, wherein the corresponding self-optimization problem comprises one or more of:
coverage capacity optimization;
inter-cell interference coordination;
mobility load balancing;
mobility robustness optimization; and
cell outage compensation.

18. The apparatus of claim 7, wherein the information received from the devices during the first period comprises one or more of measurement reports and key performance indicators.

19. The apparatus of claim 7, wherein the quality or performance problem is associated with one or more of the following:
cell outage detection;
anomaly detection; and
root cause analysis.

20. The method of claim 12, wherein:
the alternative values predicted for the future period using alternative prediction techniques comprise alternative values for a key performance indicator, the key performance indicator having a causal or correlative relationship with a quality metric for the wireless network; and
the compromise value calculated between the alternative values comprises a compromise value for the key performance indicator calculated using the alternative values for the key performance indicator.

* * * * *